United States Patent
Ghantae

(10) Patent No.: US 6,428,044 B1
(45) Date of Patent: Aug. 6, 2002

(54) BUNK RESTRAINT

(75) Inventor: Srikant S. Ghantae, Jamestown, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 09/935,844

(22) Filed: Aug. 23, 2001

(51) Int. Cl.$^7$ ............................................... B60R 21/06
(52) U.S. Cl. ...................... 280/748; 188/376; 280/749; 280/801.1; 280/805
(58) Field of Search ................. 280/748, 749, 280/801.1, 805; 297/446, 468, 470, 487; 188/371, 376

(56) References Cited

U.S. PATENT DOCUMENTS

| | | | |
|---|---|---|---|
| 3,909,038 A | | 9/1975 | McDonnell |
| 3,909,039 A | | 9/1975 | Barenyi et al. |
| 4,222,610 A | * | 9/1980 | Takada ........................ 297/483 |
| 4,906,020 A | | 3/1990 | Haberer |
| 5,290,062 A | | 3/1994 | Fohl |
| 5,375,879 A | * | 12/1994 | Williams et al. ............ 280/749 |
| 5,536,042 A | * | 7/1996 | Williams et al. ............ 280/749 |
| 6,217,069 B1 | * | 4/2001 | Ganesan ................... 280/801.1 |

* cited by examiner

Primary Examiner—Eric Culbreth
(74) Attorney, Agent, or Firm—Watts, Hoffmann, Fisher & Heinke Co., L.P.A.

(57) ABSTRACT

An over the highway vehicle having an occupant restraint system is disclosed. An improved harness for retaining an occupant in a bunk is also disclosed. The harness is connected to a bunk by a buckle and hinge arrangement. A frangible connection between an upstanding leaf of the hinge is provided which fails due to forces applied to the harness as a result of a collision. The system includes an occupant restraining strap and a buckle having a component attached to the strap and a mating component attached to the vehicle for releasably connecting the strap to the vehicle at a buckle location. An anchor securer the strap to the vehicle at a location spaced from the buckle location. The mating component to vehicle connection includes a pivot and a frangible connection for maintaining the mating component in a use position during normal vehicle operation and being designed to break upon vehicle impact causing a force of a magnitude greater than a predetermined normal magnitude whereby to permit the mating member to rotate about the pivot to position a span of the strap in a linear orientation between the pivot and the anchor.

7 Claims, 3 Drawing Sheets

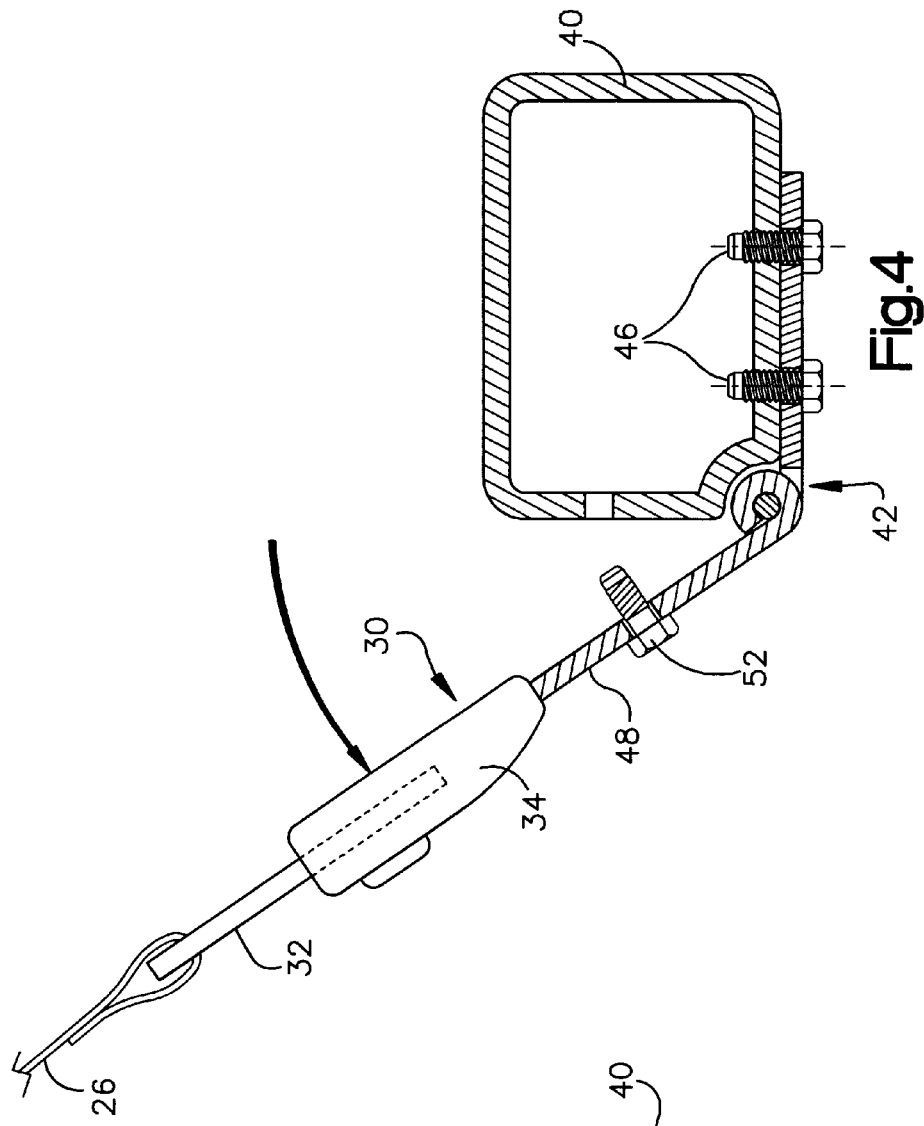
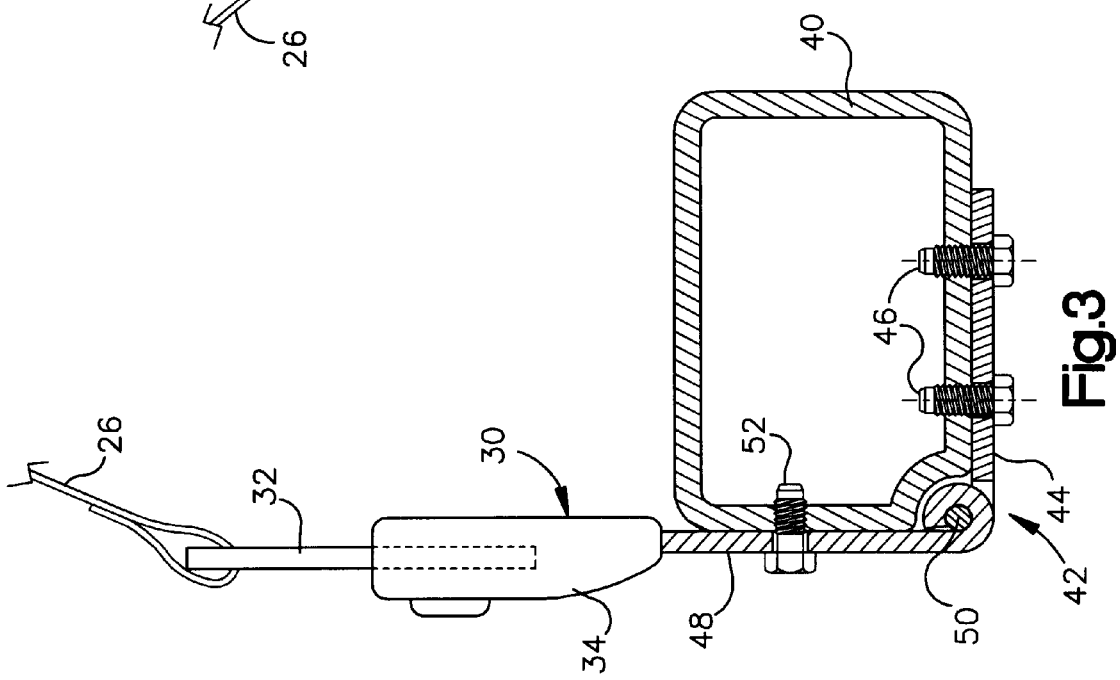

BUNK RESTRAINT

FIELD OF INVENTION

This invention relates to vehicle occupant restraint systems and more particularly to restraint systems for use in over the highway vehicles equipped with bunk beds.

BACKGROUND OF THE INVENTION

Highway tractors are often equipped with small sleeping compartments, each containing a bunk for use by non-driving occupants. Under Federal regulations each bunk is required to be equipped with an occupant restraint system. Such restraint systems are intended for use when the vehicle is moving and a non-driving occupant is resting in a bunk. Frequently used restraint systems utilize flexible restraints in the form of harnesses or nettings that function by restricting the space in which an occupant lies or by providing restraint of the occupant during an emergency.

Typically, one end of such a restraint is anchored to the vehicle. The restraint is draped over the bunk bed and the other end is releasably attached to the bunk or to the vehicle at a location spaced from the anchor to provide an enclosure over the bunk bed. The other end typically has a releasable attachment, which is a buckle of the type used by the automotive seat belts.

Other types of restraint systems employ airbags which are installed in a horizontal and/or vertical deployment position with respect to an associated bunk. The airbags deploy when there is an impact or event sufficient to trigger the airbag mechanism. Airbag deployment most likely will not occur during emergency stops or other non-impact situations that could impart significant forward momentum or inertia to an occupant using the bed. Moreover, airbags are relatively complex systems and expensive to install compared to harness or netting restraint systems. Once an airbag has been deployed, maintenance is required to install a new airbag. Such maintenance obviously results in the vehicle being out of service until the maintenance is completed.

The geometry of a typical sleeping compartment in an over the highway tractor is such that upon impact bunk restraints are loaded in bending and shear. This bunk restraint loading contrasts with typical vehicle seat belts which are loaded in tension upon impact.

The reason bunk restraints and buckle systems are located in bending and shear rather than tension is that in positioning a buckle system at a location which would be convenient to bunk occupant. The geometry of the vehicle cab is such that in anchoring the belt to a portion of the cab which has sufficient physical integrity to withstand the force imposed upon an impact and the positioning of a buckle system such that it is readily accessible and convenient for use by an occupant, results in an arrangement in which the belt is not tensioned lineally between the belt, anchor and the buckle anchor. Rather as an occupant is thrust is forward relative to a vehicle that is experiencing a collision the restraining harness wraps around the occupant to some extent but cushioning is limited by a non yielding connection to the bunk. Accordingly the forces experienced by the occupant under such conditions are substantial and can be injurious accordingly it would be desirable to provide some yielding which absorbs some a the forces in a manner such that the deceleration of the inertia motion of the occupant is more gradual and such that the harness wraps around more of the occupant thus reducing the potential for injury and the severity of it.

SUMMARY OF THE INVENTION

In accordance with the present invention, a restraint system is provided in which a latch section of a buckle is positioned at a location convenient for attachment of a coacting tongue. The buckle latch section is pivotally connected to the frame of the bunk and maintained in its convenient position by a frangible sacrificial screw. In the event of a crash and the occupant being forced against a restraint connected to the buckle, the sacrificial screw is pulled from its connection to the frame such that the connected restraint assumes a position that has a section around the occupant and a further section which is lineal between the occupant and a remote anchor secured to the cab body.

In the preferred arrangement, the occupant restraint is in the form of a harness with at least two buckles anchoring the restraint. Both buckles are positioned at locations convenient for connection by a bunk occupant. Each of the buckles has a sacrificial screw or other frangible connection such that on impact portions of the harness assume lineal positions between the occupant and the remote vehicle connected anchors while the anchoring buckle pivots.

Preferably the harness is equipped with further straps which pull a section of the harness away from an occupant. The further straps function to produce a tent like arrangement which provides clearance for an occupant with out interfering with the proper functioning of the harness in the event of a collision.

With the harness of the present invention, in the event of collision inertia will cause an occupant to tend to continue to move in the direction the vehicle has been traveling. The result is the occupant will be thrust against the harness causing the harness to wrap around the occupant with a controlled amount of inertial force absorption as the frangible connections fail. When the occupant's motion relative to the bunk is stopped, the buckle has pivoted forwardly and strap sections wrapped around the occupant while further sections extend lineally from the wrapped sections to the anchors.

Accordingly, the objects of the invention are to provide a novel and improved bunk occupant restraint system and a process of restraining an occupant in a bunk.

BRIEF DESCRIPTION OF DRAWINGS

FIG. 3 is a sectional view of a bunk frame and a partially sectioned partially elevated fragmentary view of the harness buckling system with a present invention;

FIG. 4 is a view corresponding to FIG. 3 showing the buckling system following a collision impact; and, FIG. 5 is an end view schematically illustrating the positions of an occupant and the harness of the present invention immediately following a collision.

DETAILED DESCRIPTION OF THE PREFERRED EMBODIMENTS

Figure 1:
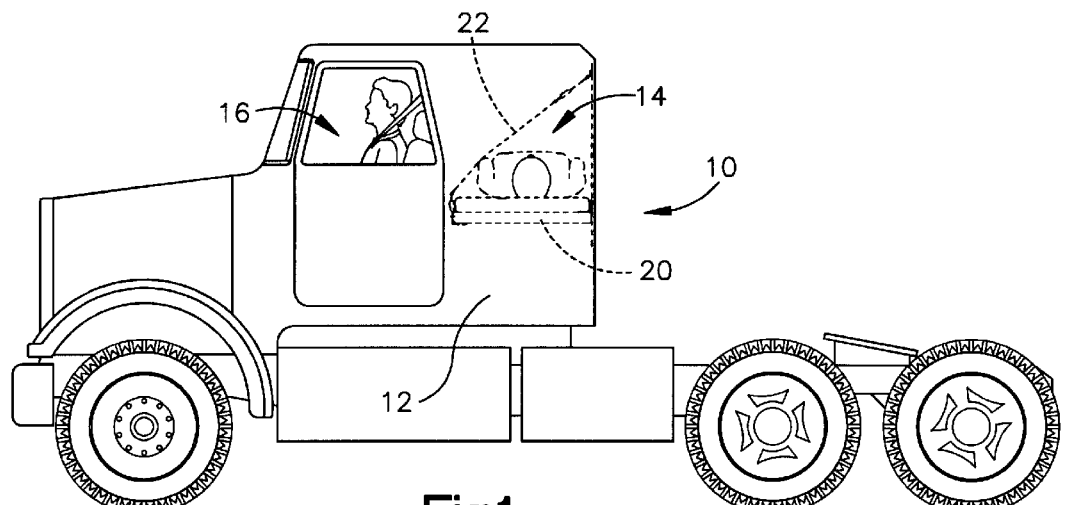
FIG. 1 is a somewhat schematic view of an over the highway tractor equipped with a sleeping compartment.

Referring to the drawings a somewhat schematic view of an over the highway tractor equipped with a sleeping compartment is shown generally at 10. The tractor 10 includes a cab 12. The cab has a sleeping compartment in the space generally indicated by the reference numeral 14 which is behind a drivers station at a location indicated by 16.

Figure 2:
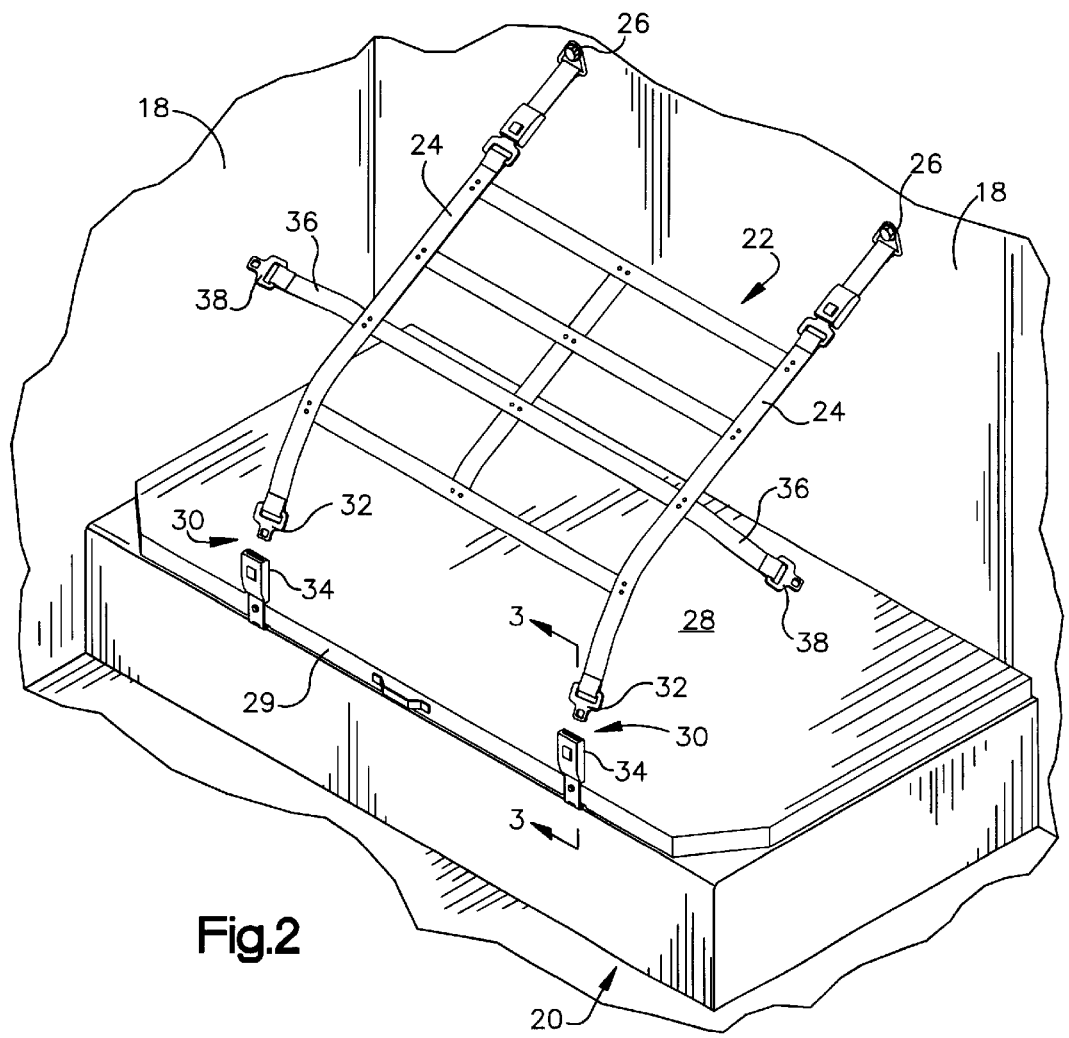
FIG. 2 is a prospective view of a vehicle bunk equipped to the harness of the present invention.

Referring to FIG. 2 a sleeping compartment is delineated by bulk heads 18. A bunk is shown somewhat schematically at 20. The bunk is equipped with a harness 22 which includes a pair of anchoring straps 24.

The straps 24 are anchored to the bulk head 18 at respective locations by anchors 26. The anchors 26 are above an occupant support surface 28 of the bunk 20 and opposite a side 29 which is open to provide occupant access.

The restraint can be stretched over the occupant space by connecting buckles 30 to anchor the straps 24. More specifically, each of the straps has a buckle tongue 32 connected at the end of the strap remote from the anchor 26. The tongues 32 coact with clasps 34 to connect the restraint over the occupant space. Restraint spacing straps 36 are respectively connected to the anchoring straps 24. The spacing straps 36 each include a buckle tongue 38 for connection to a buckle clasp, not shown, to provide clearance of the restraint from an occupant during normal use.

Referring now to FIGS. 3 and 4 the bunk includes a tubular frame section 40 which is at the opposite or open side 28 of the bunk. A hinge 42 is secured to the frame 40. More specifically a lower hinge leaf 44 is fixed to the frame 40 as by bolts 46. The hinge 42 includes a buckle leaf 48 pivotally connected to the lower leaf 44 by a pin 50. The clasp 34 is fixed to the buckle leaf 48.

A fastener 52 connects the buckle leaf 48 to the frame 40. The fastener 52 has frangible threads that are of sufficient strength to retain the buckle leaf in the position of FIG. 3 during normal use but are sufficiently weak to be torn free by collision forces to swing to the position of FIGS. 4 and 5.

OPERATION

When an occupant enters the bunk 20 the tongues 32 are inserted in their coacting clasps 34 to fix the harness 22 over the occupant. The tongues 38 may be secured to clasps, not shown, to tighten the straps 36 and lift the harness away from the occupant during normal use.

Figure 5:
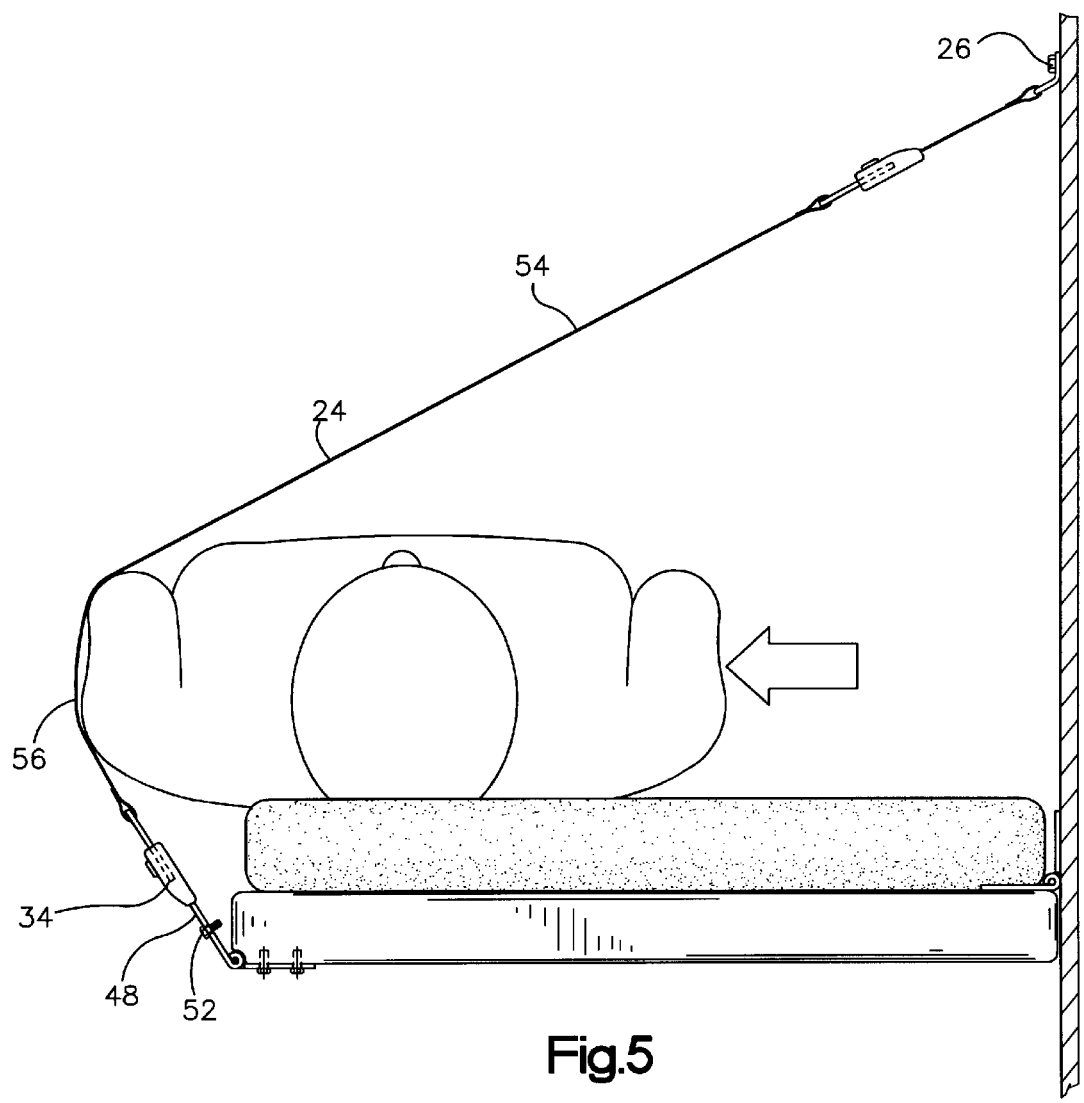

Upon collision inertia of motion will cause the occupant to continue in a direction forward of the vehicle while the motion of the vehicle is arrested as is depicted in FIG. 5. The occupant will be thrust into engagement with and restrained by the bunk restraint 22 as the straps 24 are tensioned to provide lineal sections 54 of the straps between the anchors 26 and the occupant. Further sections 56 of the straps 24 wrap around the occupant and decelerate the occupant's motion. Forces supplied by the occupant motion cause the frangible threads of the fastener 52 to fail such that the leaf 48 is moved from the position of FIGS. 2 and 3 to the position of FIGS. 4 and 5 thus increasing the time over which forces are absorbed by the occupant. Moreover the amount of wrap around contact between the straps 24 and the occupant are increased to spread the application of such force over a larger portion of the occupant's body.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. In a vehicle an occupant restraint system comprising:
   a) an occupant restraining strap;
   b) a buckle;
   c) the buckle having a component attached to the strap and a mating component attached to the vehicle for releasably connecting the strap to the vehicle at a buckle location;
   d) an anchor securing the strap to the vehicle at a location spaced from the buckle location;
   e) the mating component to vehicle connection including a pivot and a frangible connection; and,
   f) the frangible connection maintaining the mating component in a use position during normal vehicle operation and being designed to break upon vehicle impact causing a force of a magnitude greater than a predetermined normal magnitude whereby to permit the mating component to rotate about the pivot to position a section of a span of the strap around an occupant and a further section in a linear orientation between such occupant and the anchor.

2. The system of claim 1, wherein the pivot connects the mating component to a vehicle bunk.

3. The system of claim 2 wherein the mating component is attached to a frame of the bunk and the frangible connection includes a fastener threadedly engaging the frame and the threaded engagement is designed to fail upon imposition of an axial force above a predetermined magnitude.

4. The system of claim 2, wherein there are two straps, two buckles and two frangible connections.

5. The system of claim 1 wherein the mating component is attached to a frame of the bunk and the frangible connection includes a fastener threadedly engaging the frame and the threaded engagement is designed to fail upon imposition of an axial force above a predetermined magnitude.

6. In a vehicle having a bunk in a sleeping space, an occupant restraint system comprising:
   a) at least two straps;
   b) a plurality of buckles each having a strap component connected to a free end of a different and associated one of the straps, each buckle also including a coacting component;
   c) a pair of pivots respectively connecting the coacting components to the bunk;
   d) a pair of anchors respectively connecting the straps to the vehicle at locations spaced from the bunk; and,
   e) a pair of frangible connections each holding a respective one of the coacting components in a normal use position while on failure due to vehicle impact allowing the coacting members to rotate about their respective pivots to allow portions of the spans to assume occupant wrap around positions and the portions to assume lineal positions between the wrap around portions and their respective anchors.

7. The system of claim 6 wherein the mating component is attached to a frame of the bunk and the frangible connection includes a fastener threadedly engaging the frame and the threaded engagement is designed to fail upon imposition of axial force above a predetermined magnitude.

* * * * *